United States Patent
Norsten et al.

(10) Patent No.: US 7,384,463 B2
(45) Date of Patent: Jun. 10, 2008

(54) PHASE CHANGE INK CONTAINING AMPHIPHILIC MOLECULE

(75) Inventors: Tyler B. Norsten, Oakville (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/554,410

(22) Filed: Oct. 30, 2006

(65) Prior Publication Data

US 2008/0100684 A1 May 1, 2008

(51) Int. Cl.
*C09D 11/00* (2006.01)

(52) U.S. Cl. .............. 106/31.29; 106/31.61; 106/31.47; 106/31.77; 106/31.58

(58) Field of Classification Search .......... 106/31.29, 106/31.61, 31.47, 31.77, 31.58, 31.86
See application file for complete search history.

(56) References Cited

U.S. PATENT DOCUMENTS

| | | | |
|---|---|---|---|
| 4,889,560 A | 12/1989 | Jaeger et al. | |
| 4,889,761 A | 12/1989 | Titterington et al. | |
| 5,372,852 A | 12/1994 | Titterington et al. | |
| 5,621,022 A | 4/1997 | Jaeger et al. | |
| 6,320,018 B1 | 11/2001 | Sijbesma et al. | |
| 6,547,380 B2 | 4/2003 | Smith et al. | |
| 6,761,758 B2 | 7/2004 | Boils-Boissier et al. | |
| 6,811,595 B2 * | 11/2004 | Boils-Boissier et al. . | 106/31.29 |
| 6,835,833 B2 | 12/2004 | Boils-Boissier et al. | |
| 6,860,928 B2 * | 3/2005 | Breton et al. ............ | 106/31.29 |
| 6,872,243 B2 * | 3/2005 | Breton et al. ............ | 106/31.29 |
| 6,906,118 B2 * | 6/2005 | Goodbrand et al. ...... | 523/160 |
| 6,906,119 B1 * | 6/2005 | Iwasa et al. ............. | 523/218 |
| 6,972,304 B2 | 12/2005 | Smith et al. | |
| 7,025,813 B2 * | 4/2006 | Vanmaele et al. ....... | 106/31.27 |
| 7,087,752 B2 | 8/2006 | Breton et al. | |
| 2003/0079644 A1 * | 5/2003 | Smith et al. ............. | 106/31.29 |
| 2005/0031566 A1 * | 2/2005 | Cooper et al. .......... | 424/70.11 |
| 2005/0051052 A1 | 3/2005 | Vanmaele et al. | |
| 2007/0093639 A1 * | 4/2007 | Jassen et al. ............. | 528/327 |

FOREIGN PATENT DOCUMENTS

EP 1577356 A1 9/2005

OTHER PUBLICATIONS

Pekarovicova et al.; "Phase Change Inks;" *J. Coatings Tech.*; vol. 75, No. 936; Jan. 2003, pp. 65-72.
Gensler et al.; "3-Hydroxy-2-Alkyl Carboxylic Acids Related to Mycolic Acid;" *Tetrahedron*; vol. 35, 1979; pp. 2595-2600.
Hirschberg et al.; Supramolecular Polymers from Linear Telechelic Siloxanes with Quadruple-Hydrogen-Bonded Units; *Macromolecules*; vol. 32; 1999, pp. 2696-2705.
Yuasa et al.; "Facile Synthesis of β-Keto Esters from Methyl Acetoacetate and Acid Chloride: The Barium Oxide/Methanol System;" *Organic Process Research and Development*; vol. 2; 1998; pp. 412-414.
Macchia et al.; "Conformationally Restrained Ceramide Analogues: Effects of Lipophilic Modifications on the Antiproliferative Activity;" *Il Farmaco*; vol. 58; 2003; pp. 85-89.

* cited by examiner

*Primary Examiner*—Jerry A. Lorengo
*Assistant Examiner*—Shuangyi Abu Ali
(74) *Attorney, Agent, or Firm*—Oliff & Berridge PLC

(57) ABSTRACT

Phase change ink comprising an ink vehicle that includes at least one amphiphilic molecule. The amphiphilic molecule is capable of co-crystallizing into the at least one wax monomer to form functionalized spherulites which are then capable of hydrogen bonding to other similarly functionalized spherulites to form a bonded network of spherulites. Increased adhesive and cohesive strength of the ink on paper can result, thereby generating a robust image.

15 Claims, No Drawings

PHASE CHANGE INK CONTAINING AMPHIPHILIC MOLECULE

BACKGROUND

The present disclosure generally relates to phase change inks, particularly phase change ink compositions containing an amphiphilic molecule, and the use of such inks in methods for forming images, particularly their use in ink jet printing.

The inks herein are advantageous in adhesive and cohesive strength, while being able to achieve robustness and flexibility.

REFERENCES

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand.

In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (that is, liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In general, phase change inks are in the solid phase at, for example, ambient or room temperature, such as about 20° C. to about 27° C., but exist in the liquid phase at the elevated operating temperature of an ink jet printing device. At the jet operating temperature, the ink is molten and droplets of liquid ink are ejected from the printing device. When the ink droplets contact the surface of the recording substrate, either directly or via an intermediate heated transfer belt or drum, they quickly solidify to form a predetermined pattern of solidified ink drops.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head, that is, there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers have a wax based ink vehicle, for example, a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents show through on the paper.

In these systems, the crystalline wax inks are jetted onto a transfer member, for example, an aluminum drum, at temperatures of approximately 100-140° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, for example, paper, the image comprised of wax based ink is pressed into the paper.

However, the use of crystalline waxes places limitations on the printed image. Conventional crystalline waxes are apolar aliphatic molecules bound together by weak van der Waals forces. These waxes have little natural affinity for the more polar paper substrate and due to the nature of their own intermolecular bonding are vulnerable to mechanical damage.

U.S. Pat. No. 6,906,118, incorporated herein by reference in its entirety, discloses phase change ink compositions wherein at a first temperature, hydrogen bonds of sufficient strength exist between the ink vehicle molecules so that the ink vehicle forms hydrogen bonded dimers, oligomers, or polymers, and wherein at a second temperature higher than the first temperature, the hydrogen bonds between the ink vehicle molecules are sufficiently broken that fewer hydrogen-bonded dimers, oligomers, or polymers are present in the ink at the first temperature so that the viscosity of the ink at the second temperature is lower than the viscosity of the ink at the first temperature.

While known compositions and processes are suitable for their intended purposes, a need remains for improvements in phase change inks, for example for phase change inks that exhibit increased cohesion between the crystalline structures (spherulites) of the wax and adhesion to the substrate that results in an increase of robustness and flexibility of the ink.

SUMMARY

These and other improvements are accomplished by the phase change inks described herein.

In embodiments, the phase change ink is comprised of an ink vehicle, wherein the ink vehicle comprises at least one wax and at least one amphiphilic molecule comprising a hydrogen bonding group, wherein the hydrogen bonding group is a trialkyl substituted ureido pyrimidone.

In embodiments, described is a phase change ink jet device comprising at least one ink retaining reservoir holding a phase change ink, an ink jet head, and an ink supply line for providing the phase change ink to the ink jet head, wherein the phase change ink comprises an ink vehicle, wherein the ink vehicle comprises at least one wax and at least one amphiphilic molecule comprising a hydrogen bonding group, wherein the hydrogen bonding group is a trialkyl substituted ureido pyrimidone.

EMBODIMENTS

Disclosed herein are phase change inks containing at least one wax and at least one amphiphilic molecule.

The wax acts as a phase change agent in the ink. Specifically, the ink controls the phase change by being solid at room temperature and molten at jetting temperatures. The wax thus promotes the increase in viscosity of the ink as it cools from the jetting temperature, for example from about 75° C. and 150° C., to the substrate temperature, which is for example between 20° C. and 65° C.

As used herein, the term wax includes, for example, natural, modified natural, synthetic waxes and compounded waxes.

Natural waxes may be of vegetable, animal, or mineral origin. Modified waxes are natural waxes that have been treated chemically to change their nature and properties. Synthetic waxes are made by the reaction or polymerization of chemicals. Compounded waxes are mixtures of various waxes or of waxes with resins or other compounds added thereto.

Suitable waxes can include paraffins, olefins such as polyethylene and polypropylene, microcrystalline waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers and mixtures thereof.

Suitable phase change waxes include hydroxyl-terminated polyethylene waxes such as mixtures of carbon chains with the structure $CH_3$—$(CH_2)_n$—$CH_2OH$, where there is a mixture of chain lengths, n, where the average chain length is in the range of about 16 to about 50, and linear low molecular weight polyethylene, of similar average chain length. Suitable examples of such waxes include, for example, UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite (Sand Springs, Okla.).

Other suitable phase change waxes include alcohol waxes, for example, hydrogenated castor oil, 1-octadecanol, 1,10-decanediol and 1,12-dodecanediol. Other examples of mono functional alcohols that can be employed as phase change waxes herein include 1-tetradecanol, 1-pentadecanol, 1-hexadecanol, 1-heptadecanol, 1-nonadecanol, 1-eicosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol. Also suitable are Guerbet alcohols such as 2-tetradecyl 1-octadecanol, 2-hexadecyl 1-eicosanol, 2-octadecyl 1-docosanol, 2-nonadecyl 1-tricosanol, 2-eicosyl tetracosanol, and mixtures thereof. Suitable diols include 1,8-octanediol, 1,9-nonanediol, 1,13-tridecanediol, 1,14-tetradecanediol, 1,15-pentadecanediol, 1,16-hexandecanediol, 1,17-heptadecanediol, 1,18-octadecanediol, 1,19-nonadecanediol, 1,20-eicosanediol, 1,22-docosanediol, 1,25-pentacosanediol, and mixtures thereof.

In embodiments, the phase change ink includes a urethane wax, an alcohol wax, an olefin wax, or a combination thereof.

Other suitable phase change waxes include carboxylic acid waxes, for example, UNACID® 350, UNACID® 425, UNACID® 550, UNACID® 700, with $M_n$ approximately equal to 390, 475, 565 and 720 g/mol, respectively. All of these waxes are commercially available from Baker-Petrolite (Sand Springs, Okla.).

The ability of the wax to crystallize contributes to its overall hardness, which imparts strength to the ink. The degree of crystallization can be controlled by regulating the degree of branching (that is, irregularity) of the wax. A high degree of linearity of the polyethylene chain generally yields a highly crystalline and hard material.

In other embodiments, the wax is a urethane wax. These compounds are the reaction product of an isocyanate and an alcohol.

Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include n-octadecylisocyanate, hexadecylisocyanate; octylisocyanate; n- and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like, as well as mixtures thereof. Examples of diisocyanates include isophorone diisocyanate (IPDI), toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethyl-1, 6-diisocyanatohexane, tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Some specific examples of suitably functionalized alcohols include 1,4-butanediol vinyl ether, 1,4-cyclohexanedimethanol vinyl ether, ethylene glycol vinyl ether, di(ethylene glycol) vinyl ether, glycidol, 3-methyl-3-oxetanemethanol, glycerol diglycidyl ether, all of which are available from Sigma-Aldrich (Milwaukee, Wis.); 3,4-epoxycyclohexanemethanol, which can be prepared as described by Crivello and Liu (J. Polym. Sci. Part A: Polym. Chem. 2000, vol. 38, pp 389-401); and the like.

In embodiments, the wax is functionalized with one or more curable moieties, including, for example, vinyl ethers; epoxides, such as cycloaliphatic epoxides, aliphatic epoxides, and glycidyl epoxides; oxetanes; (meth)acrylates, that is, acrylates and methacrylates; and the like.

A linear wax typically forms large spherulitic (crystalline) structures when solidified from the melt. Control of the spherulite size during solidification plays a role in image quality and durability. Large spherulites generally lead to hazy and brittle prints (J. Coatings. Tech. 2003, no. 936, pp 65-72). Spherulite growth typically proceeds outward from a seed, and in the melt, a spherulite will stop growing when it physically impedes into its nearest neighbor spherulite.

While not wishing to be limited by theory, wax is a collection of many microcrystals or spherulites. The weak points tend to be located at the inter-spherulite junctions where the intermolecular interactions are disjointed. Improving the adhesion between spherulites at such inter-spherulite junctions, as well as the adhesion to a substrate, can improve the properties, such as the robustness and flexibility of images formed from the wax formulation.

Inclusion of an amphiphilic molecule in the wax based ink provides an opportunity for improved inter-spherulite adhesion. The amphiphilic molecule has a substantially polar segment and a substantially non-polar segment covalently attached within the same molecule. The amphiphilic molecule, being polar (that is, hydrophilic) at one end and water insoluble (that is, hydrophobic) at the other end, is capable of mixing well with the wax of the ink, yet has end portions repelled from the wax so as to be at an exterior surface of wax crystals. If the hydrophobic end portions are composed of hydrogen bonding groups, the amphiphilic molecule can form hydrogen bonds with other similar end groups. Thus, a hydrogen bond group is included in the amphiphilic molecule herein.

The amphiphilic molecule has hydrogen bonding groups present at one end, attached to a longer chain hydrocarbon at the other end that imparts wax-like properties to the molecule, having an effect which results in the molecule blending with the wax, but orienting itself so that the hydrogen bonding groups orient toward the outside of the spherulite upon crystallization (that is, co-crystallization). As a result, the amphiphilic molecule is available to form hydrogen bonds with other such groups in other spherulites and/or with hydrogen bonding groups in a substrate. When the wax is cooled, spherulites grow. The hydrogen bonding groups in one spherulite bond with other hydrogen bonding groups in adjoining spherulites and/or polar groups in the substrate, and create a locked network of spherulites and/or locked network of spherulites/substrate that results in increased adhesion and strength (for example, scratch resistance) of the ink image.

The hydrogen bonding group of the amphiphilic molecule may be either self-complementary or a combination of groups that are themselves complementary. The molecule is functionalized with, for example, strong self complementary hydrogen bonding interactions on one end that will increase the inter-spherulite interactions in the ink. On a relative scale, the hydrogen bonding groups can be several orders of magnitude greater in strength than the dipole and Van der Waals interactions used in current wax based inks.

The hydrogen bonding groups within an ink vehicle molecule or within a mixture of molecules comprising an ink vehicle can be either the same as each other or different from each other.

Suitable hydrogen bonding groups may have, for example, two, three or four point hydrogen bond sites. These points are the places on the molecule where the hydrogen bonding may occur. In embodiments, the hydrogen bonding groups include, for example, ureido or thiouredio pyrimidones, triazine, aminopyridine, thymine, uracil, and carboxylic acids.

The hydrogen bonding group, for example, may be a hydrogen bonding group of the ureido or thioureido pyrimidone variety, such as those of the general formula

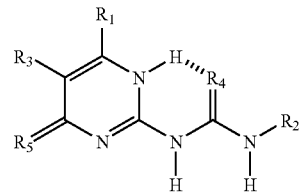

When the hydrogen bonding group is ureido pyrimidone, substitution may occur at $R_1$, $R_2$ and/or $R_3$. That is, the structure may be altered by substituting a hydrogen atom, for example, at $R_1$, $R_2$ and/or $R_3$ by adding, for example, a long hydrocarbon chain at $R_1$, $R_2$ and/or $R_3$.

In embodiments, $R_2$ may be substituted with a branched or linear hydrocarbon of from about 2 to about 60 methylene units. Substitution at only $R_2$ lowers the melting properties of the compound, for example to about 150° C.

In embodiments, both $R_1$ and $R_2$ may be substituted with a branched or linear hydrocarbon of from about 2 to about 60 methylene units. Substitution at both $R_1$ and $R_2$ lowers the melting properties of the compound, for example to about 114° C. Similar results are realized when substituting at $R_1$ and $R_3$ only.

In embodiments, trisubstitution may occur, that is, a substitution at $R_1$, $R_2$ and $R_3$, by adding, for example, a hydrocarbon chain from about 2 to about 60 methylene units. The trisubstitution of the ureido pyrimidone allows for the melting properties to be even further lowered, for example to at least about 95° C., such as for example about 90° C.

Thus, in embodiments, $R_1$, $R_2$ and $R_3$ each, independently of the other, may be a hydrogen atom, or an alkyl group (including linear, branched, cyclic, saturated and unsaturated). $R_4$ and $R_5$ each, independently of the other, may be a sulfur or oxygen atom. When $R_1$, $R_2$ and/or $R_3$ is an alkyl group, it should contain from about 2 to about 60 methylene units, such as from about 10 to about 40 or from about 12 to about 40 methylene units. If a hydrocarbon is employed, desirably the chain should be predominately linear to incorporate itself into the wax.

In embodiments, a trialkyl substituted ureido pyrimidone is used to lower the melting properties of the ink to a desirable printing temperature, for example less than 150° C., such as less than 95° C., and from about 60° C. to about 90° C.

Other suitable hydrogen bonding groups include, for example, those of the general formulas

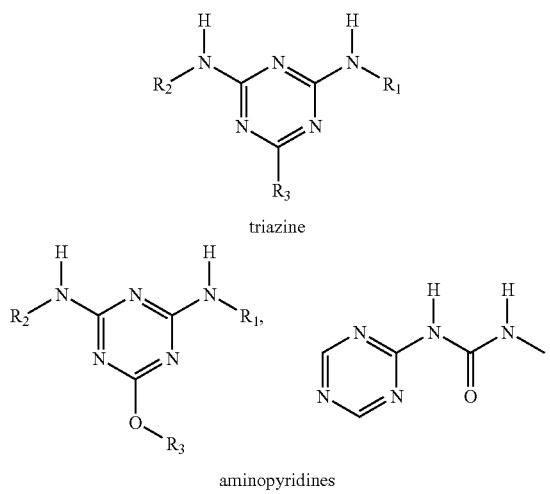

triazine aminopyridines wherein $R_1$, $R_2$ and $R_3$ each, independently of the other, is a hydrogen atom, alkyl or acyl group (including linear, branched, cyclic, saturated and unsaturated) so long as at least one of $R_1$, $R_2$ and $R_3$ is a long chain hydrocarbon. When $R_1$, $R_2$ or $R_3$ is an alkyl or acyl group, it should contain from about 2 to about 60 methylene units, such as from about 10 to about 40 or from about 12 to about 40 methylene units. If a hydrocarbon is employed, desirably the chain should be predominately linear to incorporate itself into the wax. The three point hydrogen bonding amphiphile desirably should be used with a corresponding complementary hydrogen bonding partner.

Suitable uracil and thymine hydrogen bonding groups include, for example, those of the general formula

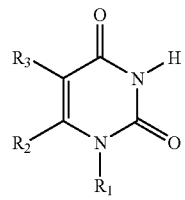

The amphiphilic hydrogen bond containing uracil may have hydrophobic chains $R_1$, $R_2$ and $R_3$. Each of $R_1$, $R_2$ and $R_3$ may be comprised, for example, of hydrogen atoms, or branched or linear hydrocarbons having from about 2 to about 60 methylene units, such as from about 10 to about 40 or from about 12 to about 40, methylene units so long as at least one of $R_1$, $R_2$ and $R_3$ is a long hydrocarbon chain. If a hydrocarbon is employed, desirably the chain should be predominately linear to incorporate itself into the wax. The three point hydrogen bonding amphiphile desirably should be used with a corresponding complementary hydrogen bonding partner.

Suitable carboxylic acid hydrogen bonding groups include, for example, those of the general formula

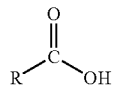

wherein the amphiphilic hydrogen bond containing carboxylic acid may have a hydrophobic chain R. The chain may comprise, for example, a branched or linear hydrocarbon having from about 2 to about 60 methylene units, such as from about 10 to about 40 or from about 12 to about 40 methylene units. Desirably the chain should be predominately linear to incorporate itself into the wax.

Other suitable three point hydrogen bonding groups include, for example, those of the general formula

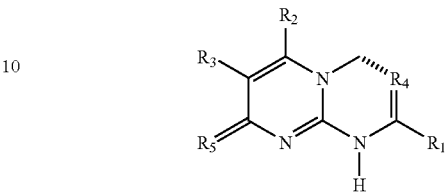

wherein $R_1$, $R_2$ and $R_3$ each, independently of the other, is a hydrogen atom, or an alkyl group (including linear, branched, cyclic, saturated and unsaturated) so long as at least one of $R_1$, $R_2$ and $R_3$ is a long hydrocarbon chain. $R_4$ and $R_5$ each, independently of the other, can be a sulfur or oxygen atom. When $R_1$, $R_2$ or $R_3$ is an alkyl group, it should contain from about 2 to about 60 methylene units, such as from about 10 to about 40 or from about 12 to about 40 methylene units. If a hydrocarbon is employed, desirably the chain should be predominately linear to incorporate itself into the wax. The three point hydrogen bonding amphiphile desirably should be used with a corresponding complementary hydrogen bonding partner.

Other suitable three point hydrogen bonding groups include, for example, those of the general formula

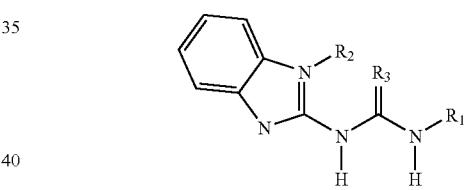

wherein $R_1$ and $R_2$ each, independently of the other, is a hydrogen atom, or an alkyl group (including linear, branched, cyclic, saturated and unsaturated) so long as at least one of $R_1$ and $R_2$ is a long hydrocarbon chain. $R_3$ can be a sulfur or oxygen atom. When $R_1$ or $R_2$ is an alkyl group it should contain from about 2 to about 60 methylene units, such as from about 10 to about 40 or from about 12 to about 40 methylene units. If a hydrocarbon is employed, desirably the chain should be predominately linear to incorporate itself into the wax. The three point hydrogen bonding amphiphile desirably should be used with a corresponding complementary hydrogen bonding partner.

When the ink vehicle contains the hydrogen groups, hydrogen bonds can form. Generally, the more hydrogen bonds formed between the groups, the more strongly bound are the moieties containing these groups, and the more energy is needed to break these hydrogen bonds. In addition, generally the greater the stability constant of the hydrogen-bonded complex, the greater the tendency for the groups to associate.

The amphiphilic molecule has an anchoring chain.

The hydrocarbon chain at the hydrogen bonding group may function as an anchoring chain. The chain may comprise, for example, a linear, branched, or unsaturated hydrocarbon having from about 2 to about 60 methylene units, such as from about 10 to about 40 or from about 12 to about 40 methylene units.

The hydrocarbon chain may be linear or substantially linear, and thus compatible with the wax of the ink composition. As such, the hydrocarbon chain enables the amphiphilic molecule to be wax-like and to have a substantial portion that is compatible with the wax component of the ink. The anchoring chain may be of the same general type of molecule as the wax, for example comprise an olefin chain where the wax is a polyethylene, comprise an isocyanate chain where the wax is a urethane, etc.

The amphiphilic molecule co-crystallizes into the wax of the ink upon cooling/formation of spherulites. As such, the functionalized side of the amphiphilic molecule protrudes into the inter-spherulite area (that is, the area between growing and adjoining spherulites), and yields a material with improved self-adhesive properties.

That is, during the cooling of the ink on a substrate, the spherulites grow in size. When adjacent spherulites grow into contact with each other, the available hydrogen bonding groups on each appropriately react to physically bond the spherulites. This reaction is able to occur at the temperatures the ink is at on cooling, for example at temperatures of about 30° C. to about 100° C., such as from about 70° C. to about 100° C.

The amphiphilic molecules may also improve the adhesion between the ink image and the substrate. That is, the ink containing the amphiphilic molecules with polar functionality on one end of the amphiphilic molecules may provide improved adhesion between ink and the paper. Particularly, where the paper includes polar groups and/or hydrogen bonding groups, or is treated to include such groups, the functionalized end of the amphiphilic molecule may also selectively bond to such groups in the paper to improve adhesion between the ink and the paper.

The amphiphilic molecule may be present in the ink in a range from about 5% to about 90% by weight of the ink, such as from about 5% to about 50% by weight of the ink and from about 10% to about 50% by weight of the ink. The wax of the ink may be present in a range of from about 10% to about 90% by weight of the ink, such as from about 10% to about 50% and from about 25% to about 60% by weight of the ink.

The phase change inks may also contain a colorant. Any desired or effective colorant can be employed, including pigment, dye, mixtures of pigment and dye, mixtures of pigments, mixtures of dyes, and the like, provided that the colorant can be dissolved or dispersed in the ink vehicle. Examples of suitable dyes include, for example, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red $H_8B$ (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; solvent dyes, including spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical); PALIOGEN Red 3340 (BASF); SUNFAST® Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC® C Orange 16 (Sun Chemical); HELIOGEN Blue K6902, K6910 (BASF); SUNFAST® Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Carbon Black 5250, Carbon Black 5750 (Columbia Chemical), and the like, as well as mixtures thereof.

The colorant is present in the phase change ink in any desired or effective amount to obtain the desired color or hue, for example in one embodiment at least about 0.1 percent by weight of the ink, and in another embodiment at least about 0.2 percent by weight of the ink, and in one embodiment no more than about 35 percent by weight of the ink, and in another embodiment less than 20 percent by weight of the ink and in another embodiment no more than about 8 percent by weight of the ink.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can include, for example, four component dyes, namely, cyan, magenta, yellow and black. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

The ink of embodiments may further include conventional additives to take advantage of the known functionality associated with such conventional additives. Such additives may include, for example, biocides, defoamers, slip and leveling agents, plasticizers, pigment dispersants, viscosity modifiers, antioxidants, absorbers, etc.

Optional antioxidants in the ink may protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba-Geigy Corporation), (2) 2,2-bis(4-(2-(3,5-di-tert-butyl-4-hydroxyhydrocinnamoyloxy))ethoxyphenyl) propane (TOPANOL-205, available from ICI America Corporation), (3) tris(4-tert-butyl-3-hydroxy-2,6-dimethyl benzyl) isocyanurate (CYANOX 1790, 41,322-4, LTDP, Aldrich D12, 840-6), (4) 2,2'-ethylidene bis(4,6-di-tert-butylphenyl) fluoro phosphonite (ETHANOX-398, available from Ethyl Corporation), (5) tetrakis(2,4-di-tert-butylphenyl)-4,4'-biphenyl diphosphonite (ALDRICH 46, 852-5; hardness value 90), (6) pentaerythritol tetrastearate (TCI America #PO739), (7) tributylammonium hypophosphite (Aldrich 42,009-3), (8) 2,6-di-tert-butyl-4-methoxyphenol (Aldrich 25, 106-2), (9) 2,4-di-tert-butyl-6-(4-methoxybenzyl)phenol (Aldrich 23,008-1), (10) 4-bromo-2,6-dimethylphenol (Aldrich 34, 951-8), (11) 4-bromo-3,5-didimethylphenol (Aldrich B6, 420-2), (12) 4-bromo-2-nitrophenol (Aldrich 30, 987-7), (13) 4-(diethyl aminomethyl)-2,5-dimethylphenol (Aldrich 14, 668-4), (14) 3-dimethylaminophenol (Aldrich D14, 400-2), (15) 2-amino-4-tert-amylphenol (Aldrich 41, 258-9), (16) 2,6-bis(hydroxymethyl)-p-cresol (Aldrich 22, 752-8), (17) 2,2'-methylenediphenol (Aldrich B4, 680-8), (18) 5-(diethylamino)-2-nitrosophenol (Aldrich 26, 951-4), (19) 2,6-dichloro-4-fluorophenol (Aldrich 28, 435-1), (20) 2,6-di-bromo fluoro phenol (Aldrich 26,003-7), (21) α-trifluoro-o-creso-1 (Aldrich 21, 979-7), (22) 2-bromo-4-fluorophenol (Aldrich 30, 246-5), (23) 4-fluorophenol (Aldrich F1, 320-7), (24) 4-chlorophenyl-2-chloro-1,1,2-tri-fluoroethyl sulfone (Aldrich 13, 823-1), (25) 3,4-difluoro phenylacetic acid (Aldrich 29,043-2), (26) 3-fluorophenylacetic acid (Aldrich 24, 804-5), (27) 3,5-difluoro phenylacetic acid (Aldrich 29,044-0), (28) 2-fluorophenylacetic acid (Aldrich 20, 894-9), (29) 2,5-bis(trifluoromethyl)benzoic acid (Aldrich 32, 527-9), (30) ethyl-2-(4-(4-(trifluoromethyl)phenoxy)phenoxy) propionate (Aldrich 25,074-0), (31) tetrakis (2,4-di-tert-butyl phenyl)-4,4'-biphenyl diphosphonite (Aldrich 46, 852-5), (32) 4-tert-amyl phenol (Aldrich 15, 384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Uniroyal Chemical Company), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The ink can also optionally contain a UV absorber. The optional UV absorbers primarily protect the generated images from UV degradation. Specific examples of suitable UV absorbers include (1) 2-bromo-2',4-dimethoxyacetophenone (Aldrich 19, 948-6), (2) 2-bromo-2',5'-dimethoxyacetophenone (Aldrich 10, 458-2), (3) 2-bromo-3'-nitroacetophenone (Aldrich 34, 421-4), (4) 2-bromo-4'-nitroacetophenone (Aldrich 24, 561-5), (5) 3',5'-diacetoxyacetophenone (Aldrich 11, 738-2), (6) 2-phenylsulfonyl acetophenone (Aldrich 34, 150-3), (7) 3'-aminoacetophenone (Aldrich 13, 935-1), (8) 4'-aminoacetophenone (Aldrich A3, 800-2), (9) 1H-benzotriazole-1-acetonitrile (Aldrich 46, 752-9), (10) 2-(2H-benzotriazol-2-yl)-4,6-di-tert-pentylphenol (Aldrich 42, 274-6), (11) 1,1-(1,2-ethane-diyl)bis(3,3,5,5-tetramethylpiperazinone) (commercially available from Goodrich Chemicals), (12) 2,2,4-trimethyl-1,2-hydroquinoline (commercially available from Mobay Chemical), (13) 2-(4-benzoyl-3-hydroxy phenoxy)ethylacrylate, (14) 2-dodecyl-N-(1,2,2,6,6-pentamethyl-4-piperidinyl) succinimide (commercially available from Aldrich Chemical Co., Milwaukee, Wis.), (15) 2,2,6,6-tetramethyl-4-piperidinyl/β-tetramethyl-3,9-(2,4,8,10-tetraoxo spiro(5,5)-undecane) diethyl-1,2,3,4-butane tetracarboxylate (commercially available from Fairmount), (16) N-(p-ethoxycarbonylphenyl)-N'-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethylpentyl-4-phenylenediamino)-1,3,5-triazine (commercially available from Uniroyal), (19) 2-dodecyl-N-(2,2,6,6-tetramethyl-4-piperidinyl) succinimide (commercially available from Aldrich Chemical Co.), (20) N-(1-acetyl-2,2,6,6-tetramethyl-4-piperidinyl)-2-dodecyl succinimide (commercially available from Aldrich Chemical Co.), (21) (1,2,2,6,6-pentamethyl-4-piperidinyl/β-tetramethyl-3,9-(2,4,8,10-tetra oxo-spiro-(5,5)undecane)diethyl)-1,2,3,4-butane tetracarboxylate (commercially available from Fairmount), (22) (2,2,6,6-tetramethyl-4-piperidinyl)-1,2,3,4-butane tetracarboxylate (commercially available from Fairmount), (23) nickel dibutyl dithio carbamate (commercially available as UV-Chek AM-105 from Ferro), (24) 2-amino-2',5-dichlorobenzophenone (Aldrich 10, 515-5), (25) 2'-amino-4',5'-dimethoxyacetophenone (Aldrich 32, 922-3), (26) 2-benzyl-2-(dimethylamino)-4'-morpholino butyrophenone (Aldrich 40, 564-7), (27) 4'-benzyloxy-2'-hydroxy-3'-methylacetophenone (Aldrich 29, 884-0), (28) 4,4'-bis(diethylamino) benzophenone (Aldrich 16,032-6), (29) 5-chloro-2-hydroxy benzophenone (Aldrich C4, 470-2), (30) 4'-piperazinoacetophenone (Aldrich 13, 646-8), (31) 4'-piperidinoacetophenone (Aldrich 11, 972-5), (32) 2-amino-5-chlorobenzophenone (Aldrich A4, 556-4), (33) 3,6-bis(2-methyl-2-morpholinopropionyl)-9-octylcarbazole (Aldrich 46,073-7), and the like, as well as mixtures thereof. When present, the optional UV absorber may be present in the ink in any desired or effective amount, such as from about 1 percent to about 10 percent by weight of the ink or from about 3 percent to about 5 percent by weight of the ink.

The ink may also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, in another embodiment of no more than about 30 percent by weight of the ink, and in yet another embodiment of no more than about 15 percent by weight of the ink, although the amount can be outside of these ranges.

Other optional additives may include tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAXAWA KE-311 Resin, a triglyceride of hydrogenated abietic (rosin) acid (commercially available from Arakawa Chemical Industries, Ltd.), synthetic polyterpene resins such as NEVTAC® 2300, NEVIAC® 100, and NEVRAC® 80 (commercially available from Neville Chemical Company), WINGTACK® 86, a modified synthetic polyterpene resin (commercially available from Goodyear), and the like, In embodiments, the tackifier may be present in an amount of at least about 0.1 percent by weight of the ink, in another embodiment of at least about 5 percent by weight of the ink, and in yet another embodiment of at least about 10 percent by weight of the ink, in yet another embodiment of no more than about 50 percent by weight of the ink, although the amount can be outside of these range. Adhesives, such as VERSAMID® 757, 759, or 744 (commercially available from Henkel), may be present in an amount in one embodiment of at least 10 about 0.1 percent by weight of the ink, in another embodiment of at least about 1 percent by weight of the ink, and in yet another embodiment of at least about 5 percent by weight of the ink, in another embodiment of no more than about 50 percent by weight of the ink, and in yet another embodiment of no more than about 10 percent by weight of the ink, although the amount can be outside of these ranges.

In embodiments, the ink may include an optional plasticizer, such as UNIPLEX® 250 (commercially 20 available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Mon25 santo), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like.

In embodiments, the optional plasticizer may be present in an amount of at least about 0.1 percent by weight of the ink, in another embodiment of at least about 1 percent by weight of the ink, and in yet another embodiment of at least about 2 percent by weight of the ink, and in one embodiment of no more than about 15 percent by weight of the ink, although the amount can be outside of these ranges, and the like.

Printed images may be generated with the ink described herein by incorporating the ink into an ink jet device, for example a thermal ink jet device, an acoustic ink jet device or a piezoelectric ink jet device, and concurrently causing droplets of the molten ink to be ejected in a pattern onto a substrate such as paper or transparency material, which can be recognized as an image. The ink is typically included in the at least one reservoir connected by any suitable feeding device to the ejecting channels and orifices of the ink jet head for ejecting the ink. In the jetting procedure, the ink jet head may be heated, by any suitable method, to the jetting temperature of the inks. The reservoir(s) containing the phase change ink may also include heating elements to heat the ink. The phase change inks are thus transformed from the solid state to a molten state for jetting. "At least one" or "one or more," as used to describe components of the ink jet device, such as the ejecting channels, orifices, etc., refers to from 1 to about 2 million, such as from about 1000 to about 1.5 million or about 10,000 to about 1 million of any such component found in the ink jet device. "At least one" or "one or more" as used to describe other components of the ink jet device such as the ink jet head, reservoir, feeder, etc., refers to from 1 to about 15, such as from 1 to about 8 or from 1 to about 4 of any such component found in the ink jet device.

The ink can be jetted onto a suitable substrate to form an image. Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, paper, transparency materials, fabrics, textile products, plastics, polymeric films, inorganic substrates such as metals, ceramics, and wood, and the like.

The composition may contain any combination of elements, as long as it meets physical properties encompassed by this disclosure. Components that may be used to form the composition are disclosed in U.S. Pat. No. 6,906,118 and is incorporated herein by reference in its entirety.

The subject matter disclosed herein will now be further illustrated by way of the following examples. All parts and percentages are by weight unless otherwise indicated.

EXAMPLES

The following are illustrative of the procedures for making the amphiphilic molecules.

Example 1 a) Synthesis of 2-Amino-6-Methyl-4-Pyrimidone (1)

The above compound was prepared according to a literature method (Hirschberg, J. H. K., Beijer, F. H., van Aert, H. A., Magusin, P. C. M., Sijbesma, R. P., Meijer, E. W., Macromolecules, 1999, 32, 2696-2705, the disclosure of which is totally incorporated herein by reference). To a 1 liter round bottom flask under an inert argon atmosphere was added 650 milliliters of dry ethanol and 90.08 grams (0.5 mole) of guanidine carbonate. Thereafter, with good stirring was added dropwise over 2 hours 130.17 grams (1 mole) of ethyl acetoacetate, after which heat was applied and the mixture refluxed for 15 hours. The mixture was then cooled to room temperature and 800 milliliters of deionized water was slowly added to induce precipitation of the product. Subsequent vacuum filtration and washing with cold acetone secured the anticipated product in 68 percent yield (mp 311° C.). All physical properties were in accord with the reported properties.

b) In a similar manner,
2-amino-6-propyl-4-pyrimidone (2) was prepared
from commercially available ethyl butyrylacetate
(Aldrich)

c) Other 6-Substituted 2-Amino-4-Pyrimidones

To vary the substitution pattern at the 6 position of the heterocyclic ring in order to lower the melt temperature it is convenient to apply a recently reported literature procedure for the preparation of beta-keto esters (Yuasa, Y., Tsurata, H., Organic Process Research and Development, 1988, 2, 412-414, the disclosure of which is totally incorporated herein by reference). This procedure affords rapid access to a wide variety of variously 4-substituted alkyl acetates (the 4-substituent being derived from an acid chloride) which can be incorporated into the above-mentioned reaction to provide 2-amino-4 pyrimidones that have varying substitution patterns at their 6 positions.

Example 2 a) To 200 milliliters of toluene was added 37.8 grams (0.24 mol) of barium oxide. After addition of water (0.5 milliliter) and activation with vigorous stirring, methyl acetoacetate (92.9 grams, 0.8 mol) was added dropwise at 25 to 30° C. over a period of one hour. Into the solution was added dropwise hexadecanoyl chloride (54.9 grams, 0.2 mol) at the same temperature over a period of 1 hour and stirring was continued for an additional hour. Methanol (15 grams, 0.47 mol) was added to the reaction mixture, which was then stirred for 16 hours. The pH of the reaction mixture was adjusted to 1 with 5 percent sulfuric acid solution and the insoluble barium salt was filtered off. The organic filtrate was washed with 5 percent sodium bicarbonate followed by brine. Solvent was removed by rotary evaporation and the product, methyl 3-keto-octadecanoate (3), was secured as a low melting solid (54° C.) by vacuum distillation in 75 percent yield. In a completely analogous fashion was prepared methyl 3-keto-dodecanoate (4) from decanoyl chloride.

b) Substituting compound (3) in Example 1a then afforded 2-amino-6-pentadecyl-4-pyrimidone (5).

c) To vary the substitution pattern at the 5 and 6 positions of the heterocyclic ring in order to achieve even lower melt quadruple hydrogen bond containing materials, di-alkyl beta-keto esters can be synthesized according to (Farmaco, 2003, 58, pp 85-89 or Tetrahedron, 1979, 35, pp 2595-2600). This procedure affords access to a wide variety of variously 2,4-dialkyl substituted alkyl acetates (the 2-substituent being derived from an acid chloride in the Farmaco procedure or an alkyl halide in the Tetrahedron procedure) which can be incorporated into the above-mentioned reaction to provide 2-amino-4 pyrimidones that have varying substitution patterns at their 5 and 6 ring positions.

Example 3 a) Ethyl palmitate (10 grams, 0.035 mol) was treated with 19.2 mL of a 2M solution of lithium diisopropylamide (0.038 mol) in THF. The solution was stirred for 2 hours at ambient temperature. Into the solution was added dropwise hexadecanoyl chloride (9.9 grams, 0.038 mol) at the same temperature and stirring was continued for an additional hour. The solvent was removed by rotary evaporation and the product, ethyl 3-oxo-2-tridecyloctadecanoate (6) was recrystallized from ethanol.

b) Employing the product of Example 3a in the method of Example 1a then afforded 2-amino-5-tetradecyl-6-pentadecyl-4-pyrimidone (7).

The heterocyclic amines of Examples 1-3 were then reacted with monofunctional isocyanates to provide ink vehicles with quadruple hydrogen bonding groups. The following general procedures are illustrative.

Example 4 a) Equimolar amounts (0.1 mole) of the product of Example 1a and octadecyl isocyanate were combined in 100 milliliters of pyridine solvent and allowed to react for 3 hours at 60° C. The reaction mixture was then allowed to cool to room temperature, which provoked crystallization. The resulting urea possessed a melting point of 145° C.

b) Equimolar amounts (0.1 mole) of the product of Example 2b and octadecyl isocyanate were combined in 100 milliliters of pyridine solvent and allowed to react for 3 hours at 60° C. The reaction mixture was then allowed to cool to room temperature, which provoked crystallization. The resulting urea possessed a melting point of 114° C.

c) Equimolar amounts (0.1 mole) of the product of Example 3b and octadecyl isocyanate were combined in 100 milliliters of pyridine solvent and allowed to react for 3 hours at 60° C. The reaction mixture was then allowed to cool to room temperature, which provoked crystallization. The resulting urea possessed a melting point of 91° C.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

Example 5

A black solid ink composition is prepared by mixing thirty grams of UNACID 550 and five grams of the product from Example 4a, two grams of the antioxidant NAUGARD 524, and two grams of the colorant Savinyl Black RLS. The mixture is heated to a temperature of 140° C. and stirred at this temperature for a period of one hour to form a homogenous mixture. Thereafter the mixture is cooled to 25° C. to yield a black solid ink.

Example 6

A black solid ink composition is prepared by mixing twenty grams of UNACID 550 and twenty grams of the product from Example 4b, two grams of the antioxidant NAUGARD 524, and two grams of the colorant Savinyl Black RLS. The mixture is heated to a temperature of 140° C. and stirred at this temperature for a period of one hour to form a homogenous mixture. Thereafter the mixture is cooled to 25° C. to yield a black solid ink.

Example 7

A black solid ink composition is prepared by mixing five grams of UNACID 550 and thirty five grams of the product from Example 4c, two grams of the antioxidant NAUGARD 524, and two grams of the colorant Savinyl Black RLS. The mixture is heated to a temperature of 140° C. and stirred at this temperature for a period of one hour to form a homogenous mixture. Thereafter the mixture is cooled to 25° C. to yield a black solid ink.

What is claimed is:

1. A phase change ink comprising an ink vehicle, wherein the ink vehicle comprises at least one wax and at least one amphiphilic molecule comprising a hydrogen bonding group, wherein the hydrogen bonding group is selected from the group consisting of

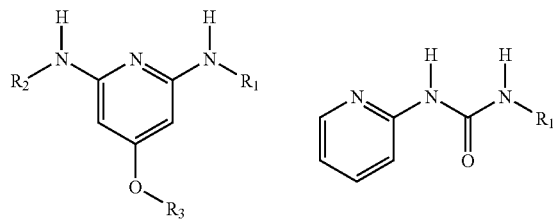

wherein $R_1$, $R_2$ and $R_3$ each, independently of the other, is a hydrogen atom, alkyl or acyl group, so long as at least one of $R_1$, $R_2$ and $R_3$ is a long hydrocarbon chain of from about 2 to 60 methylene units;

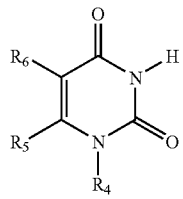

wherein $R_4$, $R_5$ and $R_6$ each, independently of the other, is a hydrogen atom or long hydrocarbon chain, so long as at least one of $R_4$, $R_5$ and $R_6$ is a long hydrocarbon chain of from about 2 to 60 methylene units; and

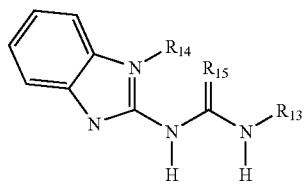

wherein at least $R_{13}$ and $R_{14}$ each, independently of the other, is a hydrogen atom or an alkyl group, so long as at least one of $R_{13}$ and $R_{14}$ is a long hydrocarbon chain of from about 2 to 60 methylene units; and wherein $R_{15}$ is a long hydrocarbon chain of from about 2 to 60 methylene units or is a sulfur or oxygen atom.

2. The phase change ink according to claim 1, wherein the at least one wax is a urethane wax, an alcohol wax, an olefin wax, or combinations thereof.

3. The phase change ink according to claim 1, wherein the amphiphilic molecule includes at least one hydrocarbon chain wherein one end is functionalized with the hydrogen bonding group.

4. The phase change ink according to claim 3, wherein the hydrocarbon chain of the amphiphilc molecule is linear or substantially linear.

5. The phase change ink according to claim 3, wherein the hydrocarbon chain has from about 2 to about 60 methylene units.

6. The phase change ink according to claim 3, wherein the hydrocarbon chain has from about 5 to about 40 methylene units.

7. The phase change ink according to claim 3, wherein the hydrogen bonding group is self-complementary or is a combination of groups that are complementary.

8. The phase change ink according to claim 1, wherein the trialkyl substitution of the ureido pyrimidone lowers the melting temperature of the ink to less than about 95° C.

9. The phase change ink according to claim 1, further comprising a colorant.

10. The phase change ink according to claim 1, wherein the phase change ink has a melting point of from about 60° C. to about 150° C.

11. The phase change ink according to claim 1, wherein the at least one wax comprises about 10% to about 90% by weight of the ink and the at least one amphiphilic molecule comprises about 5% to about 90% by weight of the ink.

12. An ink jet device comprising at least one ink retaining reservoir holding a phase change ink, an ink jet head, and an ink supply line for providing the phase change ink to the ink jet head, wherein the phase change ink comprises an ink vehicle, wherein the ink vehicle comprises at least one wax and at least one amphiphilic molecule comprising a hydrogen bonding group, wherein the hydrogen bonding group is selected from the group consisting of

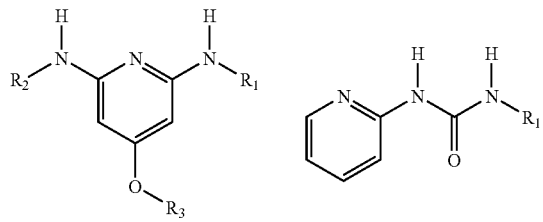

wherein $R_1$, $R_2$ and $R_3$ each, independently of the other, is a hydrogen atom, alkyl or acyl group, so long as at least one of $R_1$, $R_2$ and $R_3$ is a long hydrocarbon chain of from about 2 to 60 methylene units;

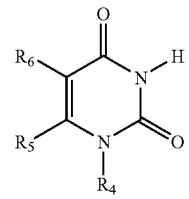

wherein $R_4$, $R_5$ and $R_6$ each, independently of the other, is a hydrogen atom or long hydrocarbon chain, so long as at least one of $R_4$, $R_5$ and $R_6$ is a long hydrocarbon chain of from about 2 to 60 methylene units; and

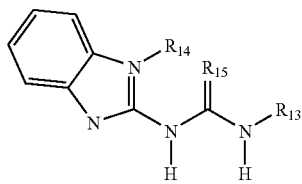

wherein at least $R_{13}$ and $R_{14}$ each, independently of the other, is a hydrogen atom or an alkyl group, so long as at least one of $R_{13}$ and $R_{14}$ is a long hydrocarbon chain of from about 2 to 60 methylene units; and wherein $R_{15}$ is a long hydrocarbon chain of from about 2 to 60 methylene units or is a sulfur or oxygen atom.

13. The ink jet device according to claim 12, wherein the device is a piezoelectric ink jet device.

14. The ink jet device according to claim 12, wherein the at least one wax is a urethane wax, an alcohol wax, an olefin wax, or combinations thereof.

15. The ink jet device according to claim 12, wherein the device includes a heating element to heat the phase change ink to about 60° C. to about 150° C.

* * * * *